US008368257B2

(12) United States Patent
Chang

(10) Patent No.: US 8,368,257 B2
(45) Date of Patent: Feb. 5, 2013

(54) INTEGRATED LINEAR BRUSHLESS DC MOTOR

(75) Inventor: Christopher C. Chang, Brentwood, CA (US)

(73) Assignee: Arcus Technology, Inc., Livermore, CA (US)

(*) Notice: Subject to any disclaimer, the term of this patent is extended or adjusted under 35 U.S.C. 154(b) by 521 days.

(21) Appl. No.: 12/604,975

(22) Filed: Oct. 23, 2009

(65) Prior Publication Data
US 2010/0102644 A1 Apr. 29, 2010

Related U.S. Application Data

(60) Provisional application No. 61/107,943, filed on Oct. 23, 2008.

(51) Int. Cl.
*H02K 41/03* (2006.01)
(52) U.S. Cl. .................. 310/12.19; 310/68 B; 318/135
(58) Field of Classification Search ............... 310/21.19, 310/12, 13, 14, 12.19, 68 B, 12.01, 12.06, 310/12.15, 12.28, 17; 318/135
See application file for complete search history.

(56) References Cited

U.S. PATENT DOCUMENTS

| 5,801,462 A * | 9/1998 | Yagoto et al. ............. 310/12.19 |
| 2004/0227412 A1 * | 11/2004 | Tamai ............................ 310/12 |

* cited by examiner

*Primary Examiner* — Tran Nguyen
*Assistant Examiner* — Leda Pham
(74) *Attorney, Agent, or Firm* — Thomas H. Ham; Wilson Ham & Holman

(57) ABSTRACT

A linear brushless DC motor uses a movable coil assembly, which includes at least one coil, an amplifier and a motor controller, that is configured to move relative to a stationary base assembly. The coil, the amplifier and the motor controller are assembled so that the coil, the amplifier and the motor controller are collectively displaced when the movable coil assembly is moved relative to the stationary base assembly.

13 Claims, 6 Drawing Sheets ures, errors in positioning (encoder cable failure), damages to the amplifier (coil cable failure) and dangerous run-away conditions (encoder cable failure).

INTEGRATED LINEAR BRUSHLESS DC MOTOR

CROSS REFERENCE TO RELATED APPLICATION

This application is entitled to the benefit of U.S. Provisional Patent Application Ser. No. 61/107,943, filed on Oct. 23, 2008, which is incorporated herein by reference.

BACKGROUND OF THE INVENTION

A typical linear brushless DC (BLDC) motor system is illustrated in FIG. 1. As shown in FIG. 1, the typical BLDC motor system includes a linear BLDC motor 100, a BLDC amplifier 102 and a motor controller 104. The linear BLDC motor 100 includes a movable coil assembly 106 that can linearly move on a stationary base assembly 108. The movable coil assembly 106 includes coils 110, an optional Hall-effect sensor 112 and an encoder reader 114 mounted on a movable structure 116. The stationary base assembly 108 includes linear guides 118, a magnet array 120, an encoder scale 122, limit position sensors 124 and 126, and an origin or home position sensor 128 mounted on a stationary platen or structure 130.

The linear BLDC motor 100 is connected to the BLDC amplifier 102 through a Hall-effect signal cable 132, a coil drive cable 134 and an encoder signal cable 136. The linear BLDC motor 100 is also connected to the motor controller 104 through limit sensor signal cables 138 and 140, and a home sensor signal cable 142. The BLDC amplifier 102 is connected to the motor controller 104 to exchange signals. The BLDC amplifier 102 and the motor controller 104 are both connected to a power source 144 through a power cable 146. The motor controller 104 is also connected to an external master controller/scheduler 148 to exchange communication signals.

In operation, the motor controller 104 provides control signals to the BLDC amplifier 102, while checking for signals from the limit and home sensors 124, 126 and 128. In response, the BLDC amplifier 102 sends drive signals to the coils 110 via the coil drive cable 134 to move the movable coil assembly 106 as needed. In this implementation, the BLDC amplifier 102 is configured to perform servo control based on signals from the Hall-effect sensor 112 and the encoder reader 114. Thus, the BLDC amplifier 102 functions as a digital servo amplifier. However, in other implementations, the servo control may be performed by the motor controller 104. In these implementations, the Hall-effect signal cable 132 and the encoder signal cable 136 are connected to the motor controller 104 to receive the appropriate signals for servo control.

A concern with the conventional linear BLDC motor 100 in either implementation is that the Hall-effect signal cable 132, the coil drive cable 134 and the encoder signal cable 136 are constantly flexed as the movable coil assembly 106 is linearly driven. This constant flexing can cause noise, strains and failures on these cables. Such results can cause performance degradation, errors in positioning (encoder cable failure), damages to the amplifier (coil cable failure) and dangerous run-away conditions (encoder cable failure).

Thus, there is a need for a linear BLDC motor that can reduce or eliminate the above concern.

SUMMARY OF THE INVENTION

A linear brushless DC motor uses a movable coil assembly, which includes at least one coil, an amplifier and a motor controller, that is configured to move relative to a stationary base assembly. The coil, the amplifier and the motor controller are assembled so that the coil, the amplifier and the motor controller are collectively displaced when the movable coil assembly is moved relative to the stationary base assembly.

A linear brushless DC motor in accordance with an embodiment of the invention comprises a stationary base assembly and a movable coil assembly. The stationary base assembly includes at least one linear guide and an array of magnets. The movable coil assembly is situated on the stationary base assembly. The movable coil assembly comprises at least one coil configured to generate magnetic field to move the movable coil assembly using the magnets of the stationary base assembly, an amplifier connected to the at least one coil to apply drive signals to the at least one coil to generate the magnetic field, and a motor controller connected to the amplifier to provide control signals to the amplifier to apply the drive signals to the coils in order to move the movable coil assembly, wherein the at least one coil, the amplifier and the motor controller are assembled so that the at least one coil, the amplifier and the motor controller are collectively displaced when the movable coil assembly is moved relative to the stationary base assembly using the at least one linear guide.

The movable coil assembly of the linear brushless DC motor may also include an encoder reader that is configured to generate encoder signals that are indicative of positions of the encoder reader relative to an encoder scale of the stationary base assembly. The encoder reader is connected to one of the amplifier and the motor controller to transmit the encoder signals.

Other aspects and advantages of the present invention will become apparent from the following detailed description, taken in conjunction with the accompanying drawings, illustrated by way of example of the principles of the invention.

DETAILED DESCRIPTION

Figure 2:
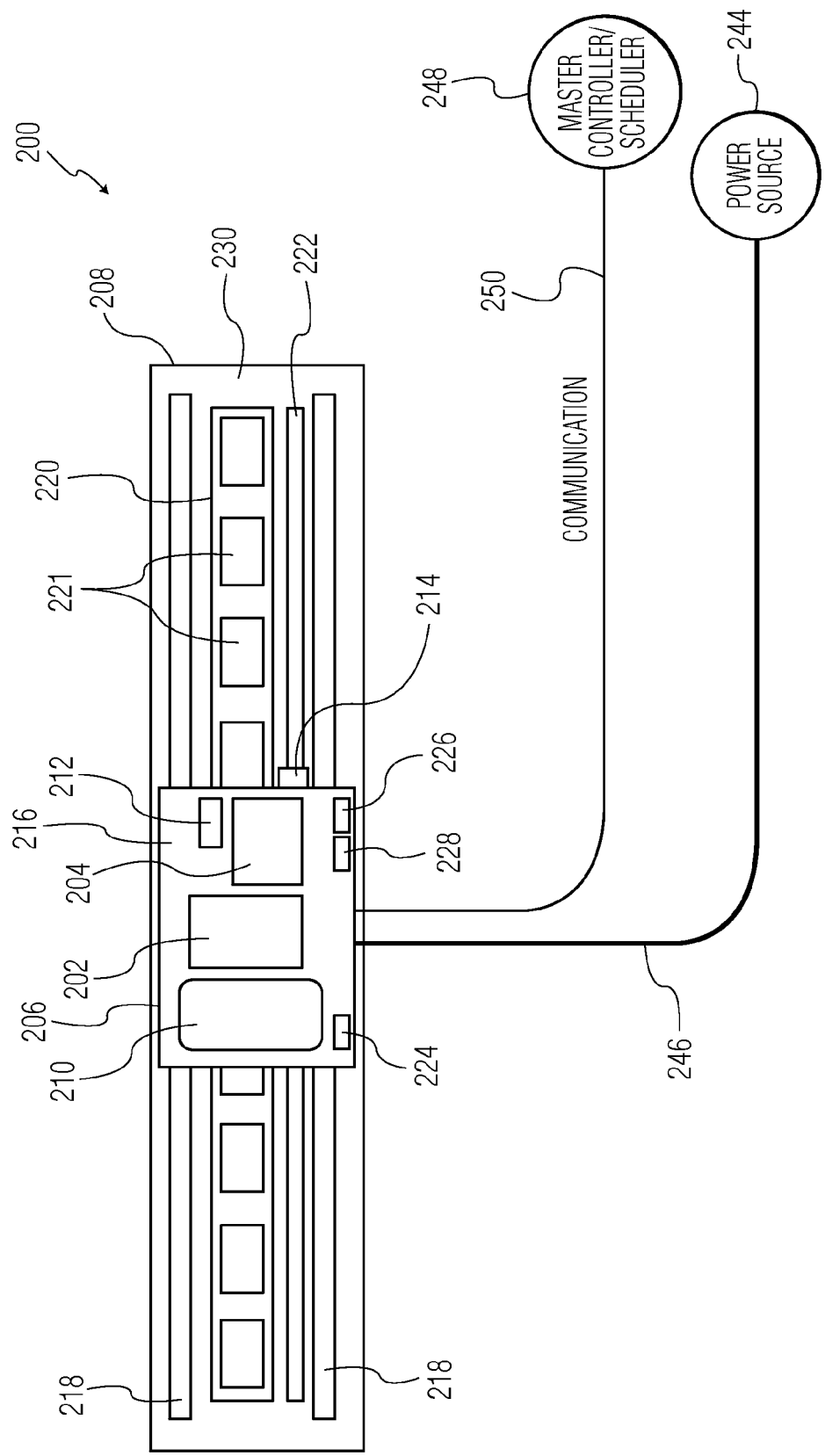
FIG. 2 is a block diagram of a linear brushless DC motor system in accordance with a first embodiment of the invention.

With reference to FIG. 2, a linear brushless DC (BLDC) motor 200 in accordance with a first embodiment of the invention is described. Similar to a conventional linear BLDC motor, the linear BLDC motor 200 includes a movable coil assembly 206 that can linearly move on a stationary base assembly 208. However, as described below, the linear BLDC motor 200 is designed to reduce important cables that are constantly flexed when the movable coil assembly 206 is linearly displaced with respect to the stationary base assembly 208. Thus, possibility of position errors and dangerous run-away conditions, as well as other detrimental results from using such cables, are reduced.

Figure 1:
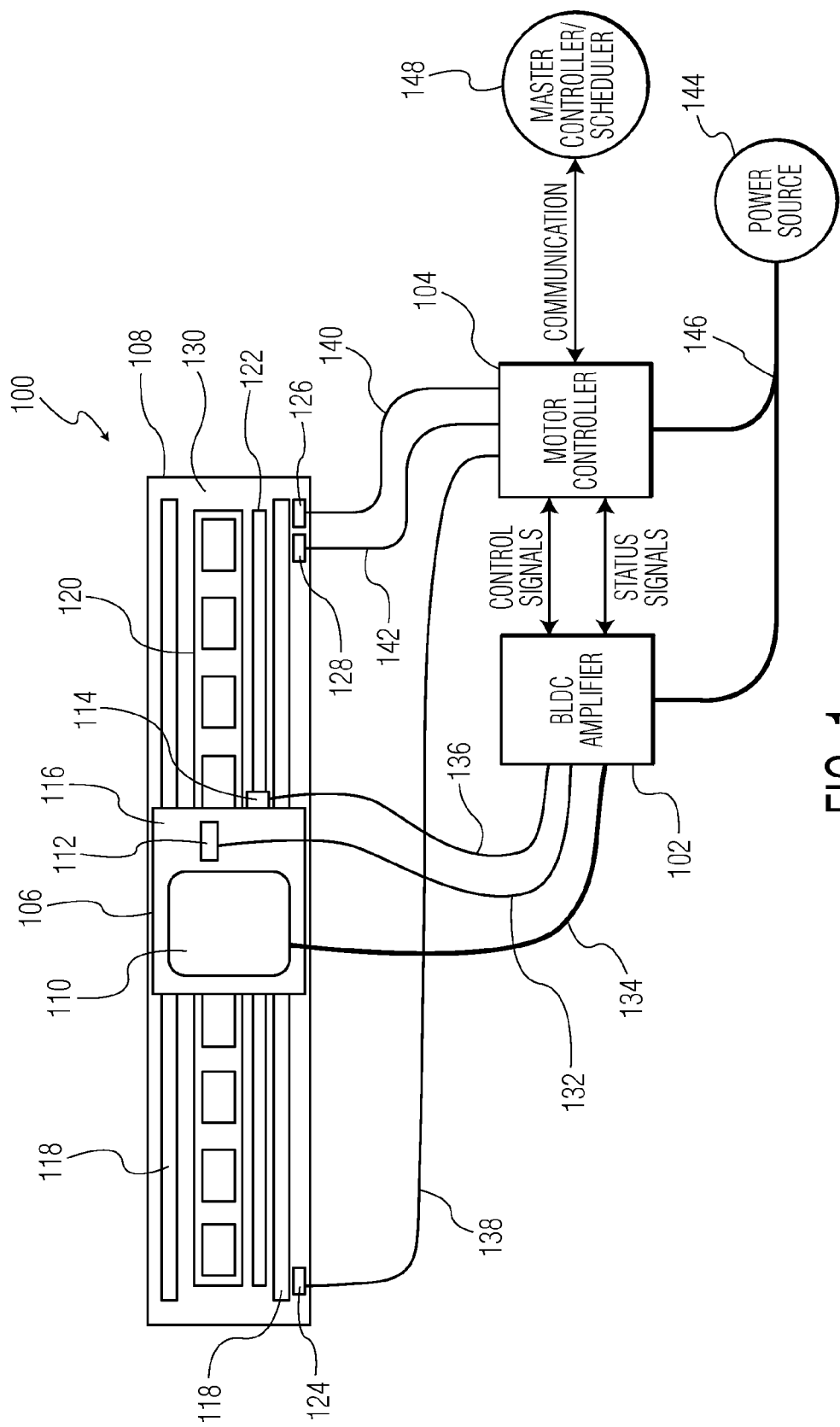
FIG. 1 is a block diagram of a typical linear brushless DC motor system in accordance with the prior art.

Similar to a conventional linear BLDC motor, the movable coil assembly 206 of the linear BLDC motor 200 includes coils 210, an optional Hall-effect sensor 212 and an encoder reader 214 mounted on a movable structure 216. However, the movable coil assembly 206 also includes a BLDC amplifier 202 and a motor controller 204 mounted on the movable structure 216, which may include one or more printed circuit boards. Thus, the BLDC amplifier 202 and the motor controller 204 are integrated with the coils 210, the Hall-effect sensor 212 and the encoder reader 214 in the movable coil assembly 206. Since the BLDC amplifier 202 and the motor controller 204 are mounted on the same structure as the coils 210, the Hall-effect sensor 212 and the encoder reader 214, these components will be collectively displaced as the movable coil assembly 206 is moved. Consequently, the wiring between the BLDC amplifier 202 and/or the motor controller 204 and the coils 210, the Hall-effect sensor 212 and the encoder reader 214 is simplified. In addition, the wiring between these components will not be flexed when the movable coil assembly 206 is moved. Thus, there is no need to use flexible cables, such as the Hall-effect signal cable 132, the coil drive cable 134 and the encoder signal cable 136 of the conventional linear BLDC motor system shown in FIG. 1, which can be expensive and difficult to connect to the desired components. Thus, the elimination of these cables can drastically reduce assembly time and material cost.

The movable coil assembly 206 of the linear BLDC motor 200 further includes active components of limit position sensors 224 and 226 and an origin or home position sensor 228 mounted on the movable structure 216. An active component of a position sensor includes active electrical and/or optoelectronic elements, as described in more detail below. In the conventional linear BLDC motor 100, the active components of the sensors 124, 126 and 128 are mounted on the stationary platen 130 of the stationary base assembly 108 and electrically connected to the motor controller 104. However, since the motor controller 204 of the linear BLDC motor 200 is mounted on the movable structure 216 of the movable coil assembly 206, the active components of the limit sensors 224 and 226 and the home sensor 228, are also mounted on the movable structure. The limit sensors 224 and 226 and the home sensor 228 are electrically connected to the motor controller 204 to provide signals when the sensors detect that the movable coil assembly 206 is moved to positions associated with these sensors.

The BLDC amplifier 202 of the movable coil assembly 206 is configured to apply coil drive signals to the coils 210 in response to control signals from the motor controller 204 so that magnetic field is generated by the coils to displace the movable coil assembly. The BLDC amplifier 202 is also configured to provide status signals to the motor controller 204. Thus, the BLDC amplifier 202 is electrically connected to the motor controller 204 to receive and send control and status signals. In some embodiments, the BLDC amplifier 202 is further configured to perform servo control, and thus, is a digital servo amplifier. In these embodiments, the Hall-effect sensor 212 and the encoder reader 214, as well as the coils 210, are electrically connected to the BLDC amplifier 202 so that the BLDC amplifier can receive signals for servo calculations. The results of the servo calculations are used to accurately move the movable coil assembly 206 to the proper positions. In other embodiments, the BLDC amplifier 202 is configured as a simple amplifier and is not configured to perform servo control. In these embodiments, the motor controller 204 is configured to perform servo control. Thus, in these embodiments, the Hall-effect sensor 212 and the encoder reader 214 are electrically connected to the motor controller 204 so that the motor controller can receive signals for servo calculations.

As described above, the motor controller 204 of the movable coil assembly 206 is configured to provide control signals to the BLDC amplifier 202 so that the BLDC amplifier can apply driving signals to the coils 210 to move the movable coil assembly as needed. In addition, the motor controller 204 is also configured to check for limits and home sensor status using the signals from the limits sensor 224 and 226 and the home sensor 228. In some embodiments, the motor controller 204 is configured to use proportional integral differential (PID) motor control to control the displacement of the movable coil assembly 206. As noted above, in some embodiments, the motor controller 204 may also be configured to perform servo control. In other embodiments, the servo control is performed by the BLDC amplifier 202. The motor controller 204 is connected to an external master controller/scheduler 248, which can be a programmable logic circuit or a computer, through a communication cable 250. The motor controller 204 may be a general-purpose digital processor, such as a microprocessor or microcontroller, or a special-purpose processor, such as a digital signal processor. The motor controller 204 may also be another type of a controller or a field programmable gate array (FPGA).

The movable coil assembly 206 is connected to a power source 244 through a power cable 246, which provides electrical power to the BLDC amplifier 202, the motor controller 204, and any other component of the movable coil assembly 206 that requires power. Thus, in this embodiment, the only wires that are flexed are the communication cable 250 and the power cable 246. In operation, communication cable failure can be detected using one of many available check-sum communication protocol schemes. In case of any communication error, the motor controller 204 is still in control of the linear BLDC motor 200 and is able to detect this communication error and can gracefully determine an appropriate course of action. In case of power cable failure, the movable coil assembly 206 may include a charge capacitor or any short duration power reservoir for the motor controller 204 to have enough time to detect the power failure and to gracefully notify and shutdown if necessary. Alternatively, the linear BLDC motor 200 may include a braking system that stops the movable coil assembly 206 when there is power cable failure.

The stationary base assembly 208 includes linear guides 218, a magnet array 220 and an encoder scale 222 on a stationary platen 230. The linear guides 218 are used by the movable coil assembly 206 to move relative to the stationary base assembly 208, typically using bearings. Although the stationary base assembly 208 is shown to include two linear guides, the stationary base assembly can have any number of linear guides. The magnet array 220 includes a number of permanent magnets 221, which are used to interact with the magnetic field generated by the coils 210 of the movable coil assembly 206 to linearly displace the movable coil assembly relative to the stationary base assembly 208. The magnetic fields of these magnets 221 are detected by the Hall-effect sensor 212 of the movable coil assembly 206 to determine the position of the movable coil assembly relative to the magnets of the stationary base assembly 208. Signals generated by the Hall-effect sensor 212 are used by the BLDC amplifier 202 or the motor controller 204 for servo control. The encoder scale 222 is used by the encoder reader 214 of the movable coil assembly 206 to determine the position of the movable coil assembly relative to the stationary base assembly 208. The encoder reader 214 is configured to generate signals that are indicative of positions of the encoder reader relative to the encoder scale 222 in order to determine the position of the movable coil assembly 206. The signals generated by the encoder reader 214 may also be used by the BLDC amplifier 202 or the motor controller 204 for servo control. As an example, the encoder reader 214 may be an optical encoder reader to optically track the movement of the movable coil assembly 206 using the encoder scale 222 on the stationary platen 230.

Figure 3A:
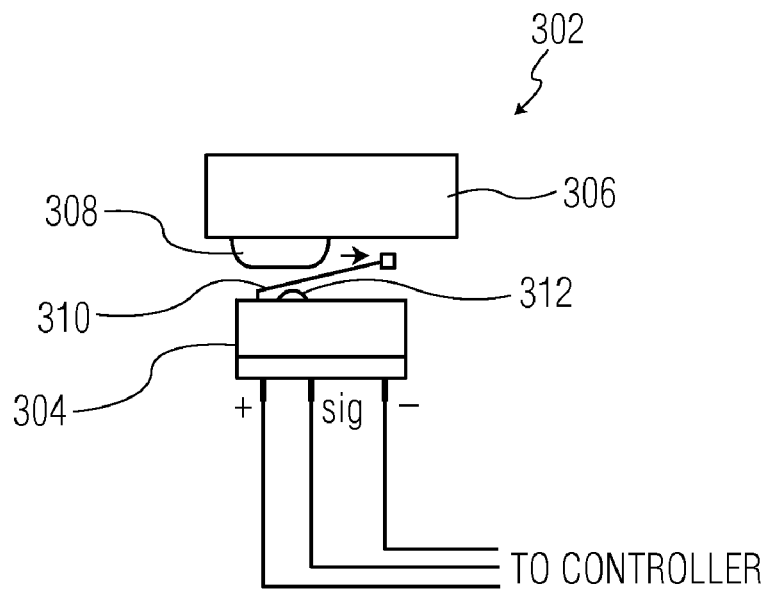
FIG. 3A is a diagram of a mechanical sensor in accordance with an embodiment of the invention.
Figure 3B:
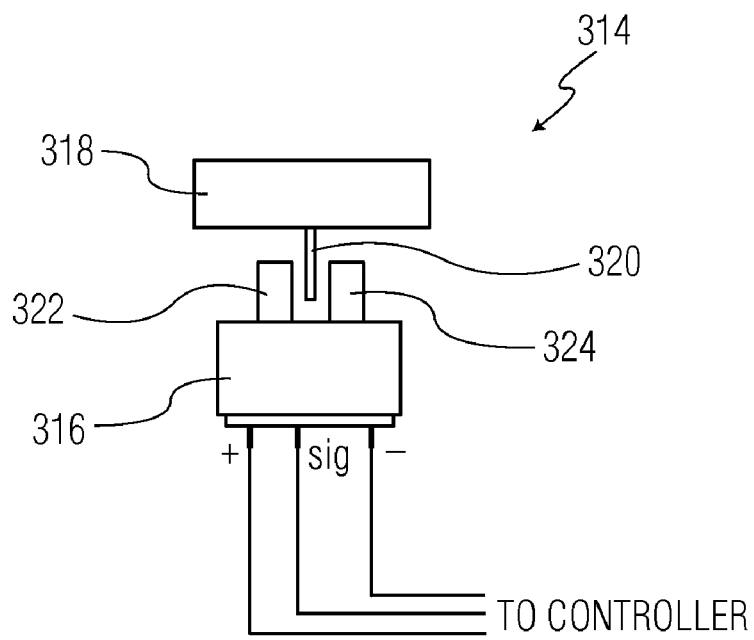
FIG. 3B is a diagram of an optical sensor in accordance with an embodiment of the invention.

Turning now to FIGS. 3A and 3B, two examples of position sensors that can be used as the limit and home sensors 224, 226 and 228 of the linear BLDC motor 200 are shown. FIG. 3A shows a mechanical sensor 302 that includes an active component 304 and a passive component 306. The active component 304 includes active electrical elements that generate an electrical signal when activated by the passive component 306, which does not include any active electrical elements. In the example shown in FIG. 3A, the passive component 306 includes a protrusion 308 that engages a lever 310 of the active component 304, which in turn depresses a switch 312 of the active component. When depressed, the switch 312 generates an electronic signal indicating that the mechanical sensor 302 has been activated, which is transmitted to a controller. FIG. 3B shows an optical sensor 314 that includes an active component 316 and a passive component 318. The active component 316 includes active optoelectronic elements that generate an electronic signal when activated by the passive component 318, which does not include any active electrical elements. In the example shown in FIG. 3B, the passive component 318 includes an extension 320 that block a beam of light generated by a light source 322 of the active component 316. The break in the beam of light is detected by an optical detector 324 of the active component 316, which generates and sends an electrical signal to a controller.

Figure 4:
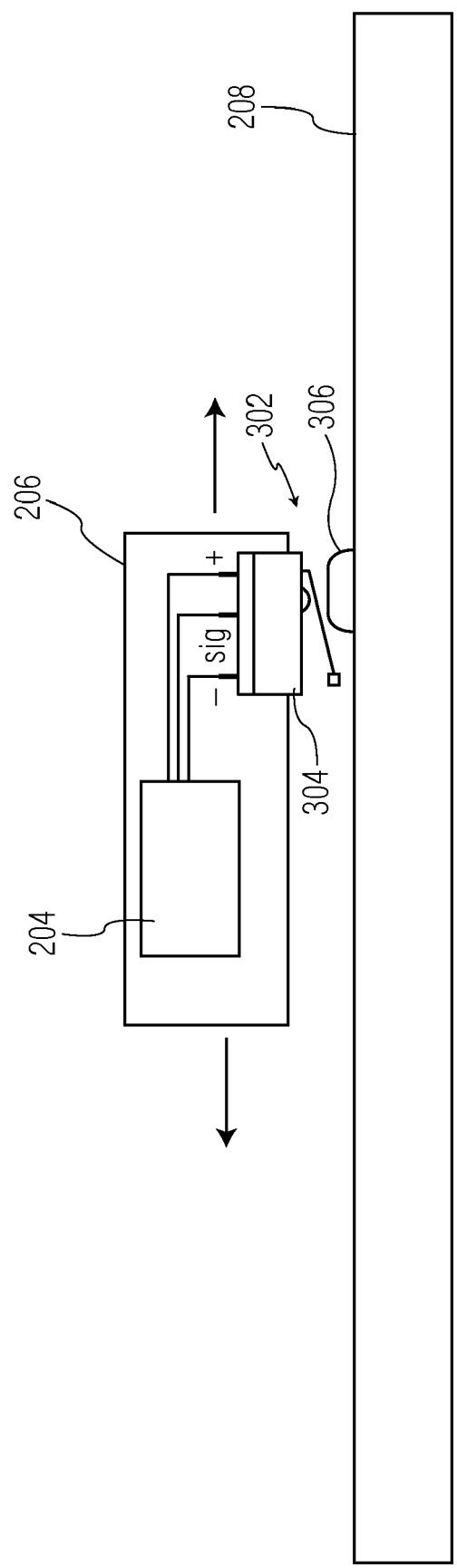
FIG. 4 is a diagram of the mechanical sensor of FIG. 3A, illustrating the locations of active and passive component of the sensor on the linear brushless DC motor of FIG. 2.

In a conventional linear BLDC motor, the active component of a position sensor is mounted on the stationary base assembly of the motor and the passive component of the sensor is mounted on the movable coil assembly of the motor. However, in the linear BLDC motor 200, the active component of a position sensor is mounted on the movable coil assembly 206 and the passive component of the sensor is mounted on the stationary base assembly 208, as illustrated in FIG. 4 using the mechanical sensor 302. Other types of mechanical, optical or magnetic sensors can be installed in the linear BLDC motor 200 in a similar manner as the limit and home sensors 224, 226 and 228.

Figure 5:
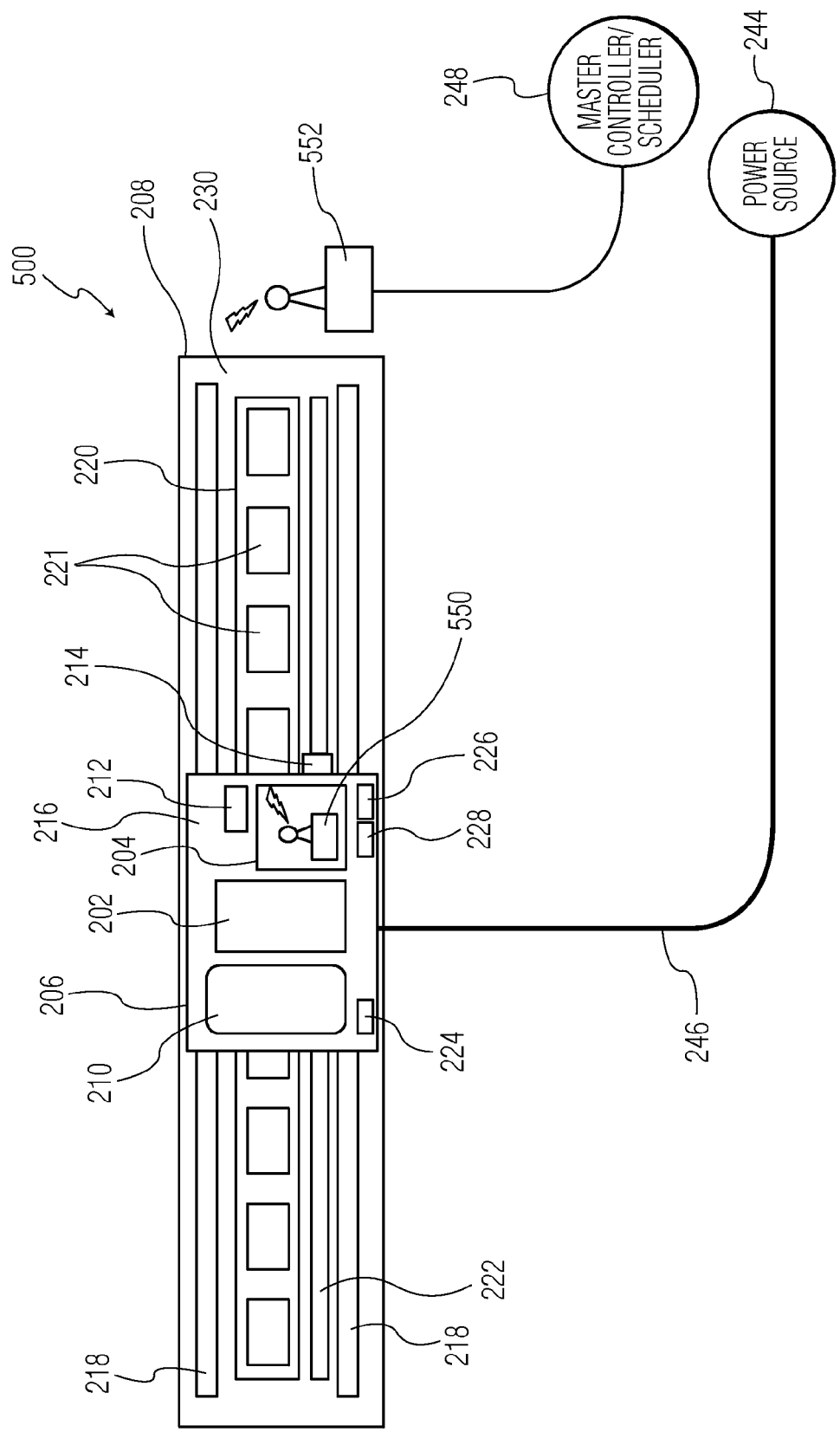
FIG. 5 is a block diagram of a linear brushless DC motor system in accordance with a second embodiment of the invention.

Turning now to FIG. 5, a linear BLDC motor 500 in accordance with a second embodiment of the invention is shown. The linear BLDC motor 500 includes all the components of the linear BLDC motor 200 shown in FIG. 2 except for the communication cable 250. The communication cable 250 is eliminated in the linear BLDC motor 500 by utilizing wireless communication, such as optical or radio frequency (RF) communication, between the motor controller 204 and the external master controller/scheduler 248. As shown in FIG. 5, the movable coil assembly 206 includes a wireless device 550, which is configured to receive and transmit signals. The wireless device 550 is connected to the motor controller 204 so that the motor controller can communicate with the external master controller/scheduler 248, which is connected to another wireless device 552 to wirelessly receive and transmit signals. Thus, in this embodiment, the only cable that is flexed during operation of the linear BLDC motor 500 is the power cable 246.

Figure 6:
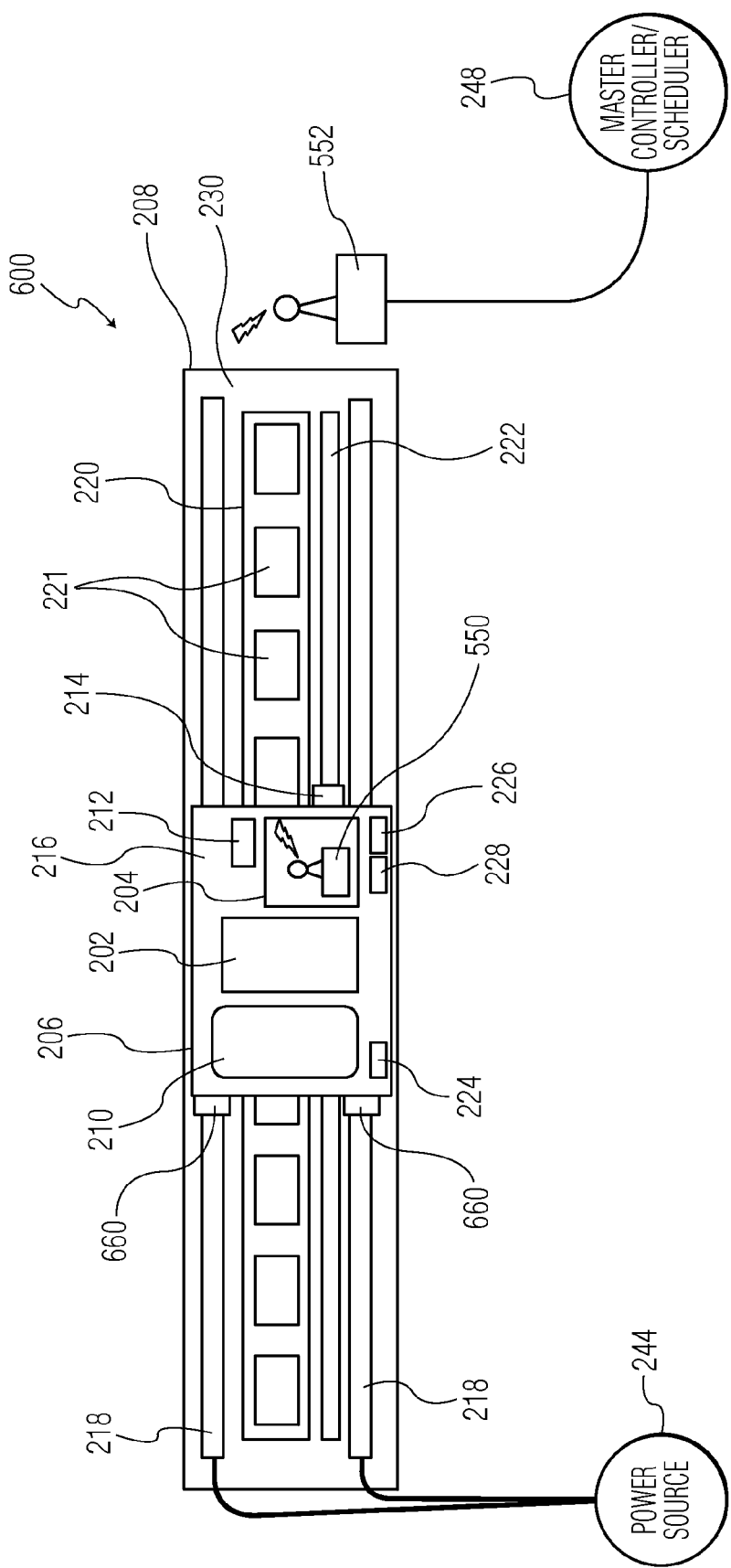
FIG. 6 is a block diagram of a linear brushless DC motor system in accordance with a third embodiment of the invention.

Turning now to FIG. 6, a linear BLDC motor 600 in accordance with a third embodiment of the invention is shown. The linear BLDC motor 600 includes all the components of the linear BLDC motor 500 shown in FIG. 5 except for the power cable 246. The power cable 246 is eliminated in the linear BLDC motor 600 by utilizing the existing linear guides 218 or additional linear guides to transmit electrical power from the power source 244 to the components of the movable coil assembly 206 that require electrical power, such as the BLDC amplifier 202 and the motor controller 204. In this embodiment, the movable coil assembly 206 includes electrical connectors 660 that electrically contact the existing linear guides 218 or other linear guides that are connected to the power source 244 to receive power for the components of the movable coil assembly, which eliminates the need for a power cable. Thus, in this embodiment, there are no cables that are flexed during operation of the linear BLDC motor 600.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A linear brushless DC motor comprising:
a stationary base assembly including at least one linear guide and an array of magnets, the stationary base assembly further including a passive component of a limit position sensor;
a movable coil assembly situated on the stationary base assembly, the movable coil assembly comprising:
at least one coil configured to generate magnetic field to move the movable coil assembly using the magnets of the stationary base assembly;
a Hall-effect sensor configured to detect magnetic fields of the magnets of the stationary base to determine a position of the movable coil assembly;
an amplifier connected to the at least one coil to apply drive signals to the at least one coil to generate the magnetic field;
a motor controller connected to the amplifier to provide control signals to the amplifier to apply the drive signals to the coils in order to move the movable coil assembly; and
an active component of the limit position sensor configured to generate a signal when activated by the passive component of the stationary base, the active component being connected to one of the amplifier and the motor controller; and
a master controller/scheduler that is external to the movable coil assembly, the master controller/scheduler being connected to the motor controller of the movable coil assembly through a communication cable,
wherein the at least one coil, the Hall-effect sensor, the amplifier, the motor controller and the active component are assembled so that the at least one coil, the amplifier and the motor controller are collectively displaced when the movable coil assembly is moved relative to the stationary base assembly using the at least one linear guide.

2. The motor of claim 1 wherein the limit position sensor is an optical position sensor, the active component including a light source that generates a beam of light and an optical detector, the passive component including an extension that blocks the beam of light when the movable coil assembly is moved to a limit position.

3. The motor of claim 1 wherein the limit position sensor is a mechanical position sensor, the active component including a lever and a switch, the passive component including an extension that engages the lever that depresses the switch when the movable coil assembly is moved to a limit position.

4. The motor of claim 1 wherein the movable coil assembly further includes an electrical connector that contacts the at least one linear guide to receive electrical power from the at least one linear guide to provide the electrical power to at least the amplifier and the motor controller.

5. The motor of claim 1 wherein the movable coil assembly further includes an electrical connector that contacts another linear guide of the stationary base assembly to receive electrical power from the another linear guide to provide the electrical power to at least the amplifier and the motor controller.

6. The motor of claim 1 wherein the movable coil assembly further includes an encoder reader and wherein the stationary base assembly further includes an encoder scale, the encoder reader being configured to generate signals that are indicative of positions of the encoder reader relative to the encoder scale.

7. The motor of claim 6 wherein the amplifier is configured to perform servo control using signals from the encoder reader.

8. The motor of claim 6 wherein the motor controller is configured to perform servo control using signals from the encoder reader.

9. A linear brushless DC motor comprising:
a stationary base assembly including at least one linear guide, an array of magnets and an encoder scale, the stationary base assembly further including passive components of limit position sensors;
a movable coil assembly situated on the stationary base assembly, the movable coil assembly comprising:
at least one coil configured to generate magnetic field to move the movable coil assembly using the magnets of the stationary base assembly;
a Hall-effect sensor configured to detect magnetic fields of the magnets of the stationary base to determine a position of the movable coil assembly;
an amplifier connected to the at least one coil to apply drive signals to the at least one coil to generate the magnetic field;
a motor controller connected to the amplifier to provide control signals to the amplifier to apply the drive signals to the coils in order to move the movable coil assembly;
an encoder reader configured to generate encoder signals that are indicative of positions of the encoder reader relative to the encoder scale, the encoder reader being connected to one of the amplifier and the motor controller to transmit the encoder signals; and
active components of the limit position sensors configured to generate a signal when activated by one of the passive components of the stationary base, the active components being connected to one of the amplifier and the motor controller; and
a master controller/scheduler that is external to the movable coil assembly, the master controller/scheduler being connected to the motor controller of the movable coil assembly through a communication cable,
wherein the at least one coil, the Hall-effect sensor, the amplifier, the motor controller, the encoder reader and the active components are assembled so that the at least one coil, the amplifier and the motor controller are collectively displaced when the movable coil assembly is moved relative to the stationary base assembly using the at least one linear guide, and wherein the moveable coil assembly is directly connected to a power source through a power cable to power at least the motor controller on the movable coil assembly.

10. The motor of claim 9 wherein at least one of the limit position sensors is an optical position sensor, the active component of the optical position sensor including a light source that generates a beam of light and an optical detector, the passive component of the optical position sensor including an extension that blocks the beam of light when the movable coil assembly is moved to a limit position.

11. The motor of claim 9 wherein at least one of the limit position sensors is a mechanical position sensor, the active component of the mechanical position sensor including a lever and a switch, the passive component of the mechanical position sensor including an extension that engages the lever that depresses the switch when the movable coil assembly is moved to a limit position.

12. The motor of claim 9 wherein the movable coil assembly further includes a wireless device connected to the motor controller to wirelessly transmit and receive signals to and from an external controller.

13. The motor of claim 9 wherein the amplifier is configured to perform servo control using the encoder signals from the encoder reader.

* * * * *